(12) United States Patent
Kawaba et al.

(10) Patent No.: US 8,219,625 B2
(45) Date of Patent: Jul. 10, 2012

(54) LINKAGE SUPPORT APPARATUS AND METHOD THEREOF

(75) Inventors: Motoyuki Kawaba, Kawasaki (JP);
Hidekazu Takahashi, Kawasaki (JP);
Yuuji Hotta, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 12/405,767

(22) Filed: Mar. 17, 2009

(65) Prior Publication Data

US 2009/0248899 A1 Oct. 1, 2009

(30) Foreign Application Priority Data

Mar. 28, 2008 (JP) ................................. 2008-085372

(51) Int. Cl.
*G06F 15/16* (2006.01)
(52) U.S. Cl. ......... 709/206; 709/200; 709/223; 709/224
(58) Field of Classification Search .................. 709/200, 709/206, 223, 224
See application file for complete search history.

(56) References Cited

U.S. PATENT DOCUMENTS

| | | | |
|---|---|---|---|
| 5,740,355 A | 4/1998 | Watanabe et al. | |
| 5,905,863 A * | 5/1999 | Knowles et al. | 709/206 |
| 5,960,382 A * | 9/1999 | Steiner | 704/2 |
| 7,103,676 B2 * | 9/2006 | Payrits et al. | 709/236 |
| 7,428,573 B2 * | 9/2008 | McCanne et al. | 709/203 |
| 7,480,707 B2 * | 1/2009 | Morlitz | 709/223 |
| 7,515,903 B1 * | 4/2009 | Cast | 455/413 |
| 7,774,408 B2 * | 8/2010 | Sinha et al. | 709/206 |
| 2003/0217071 A1 * | 11/2003 | Kobayashi et al. | 707/102 |
| 2004/0052214 A1 * | 3/2004 | Teh et al. | 370/238 |
| 2005/0198100 A1 * | 9/2005 | Goring et al. | 709/200 |
| 2006/0101014 A1 * | 5/2006 | Forman et al. | 707/6 |
| 2006/0248169 A1 * | 11/2006 | Matsutsuka et al. | 709/219 |
| 2007/0016648 A1 * | 1/2007 | Higgins | 709/206 |
| 2007/0067479 A1 * | 3/2007 | Angelov | 709/231 |
| 2007/0248023 A1 | 10/2007 | Chui | |
| 2008/0082566 A1 * | 4/2008 | Aggarwal et al. | 707/102 |
| 2008/0159140 A1 | 7/2008 | Robinson et al. | |

FOREIGN PATENT DOCUMENTS

| | | |
|---|---|---|
| EP | 1 239 635 A1 | 9/2002 |
| JP | A 9-128342 | 5/1997 |
| WO | WO 2007/022441 A1 | 2/2007 |

\* cited by examiner

*Primary Examiner* — John Follansbee
*Assistant Examiner* — Anthony Mejia
(74) *Attorney, Agent, or Firm* — Greer, Burns & Crain, Ltd.

(57) ABSTRACT

A linkage support system links related messages among a plurality of messages sent and received among a plurality of communication terminals. The linkage support system includes an information acquisition unit that acquires message types of the plurality of messages, character strings included in the plurality of messages, and amount of data flow when the character strings are transferred. An unnecessary character strings exclusion unit that excludes character strings that are not required as keywords for linkage processing, based on the information acquired by the information acquisition unit, and a processing order determination unit determines order for using a plurality of character strings from which unnecessary character strings are excluded by the unnecessary character strings exclusion unit.

17 Claims, 23 Drawing Sheets

FIG. 4

EXAMPLE OF INPUT DATA

| message type | ID CHARACTER STRING | AMOUNT OF MESSAGE FLOW |
|---|---|---|
| message1 | A,B | 0.5 MBps |
| message2 | B,C | 3 MBps |
| message3 | C,D | 2 MBps |
| message4 | D | 2 MBps | message1: A, B
message2: B, C
message3: C, D
message4: D message1: B
message2: B, C
message3: C, D
message4: D

FIG. 12

| message type | ID CHARACTER STRINGS | AMOUNT OF MESSAGE FLOW |
|---|---|---|
| message1 | B | 0.5 MBps |
| message2 | B,C | 3 MBps |
| message3 | C,D | 2 MBps |
| message4 | D | 2 MBps |

FIG. 14

| message type | ID CHARACTER STRINGS | AMOUNT OF MESSAGE FLOW |
|---|---|---|
| message3 | C,D | 2 MBps |
| message4 | D | 2 MBps |

FIG. 15

| message type | ID CHARACTER STRINGS | AMOUNT OF MESSAGE FLOW | LINKAGE HISTORY |
|---|---|---|---|
| message1 | C | 0.5 MBps | B |
| message2 | C | 3 MBps | B |
| message3 | C | 2 MBps | D |
| message4 | C | 2 MBps | D |

FIG. 16

| message type | ID CHARACTER STRINGS | AMOUNT OF MESSAGE FLOW | LINKAGE HISTORY |
|---|---|---|---|
| message1 | B | 0.5 MBps | |
| message2 | B,C | 3 MBps | |
| message3 | C,D | 2 MBps | |
| message4 | D | 2 MBps | |

| message type | ID CHARACTER STRINGS | AMOUNT OF MESSAGE FLOW | LINKAGE HISTORY |
|---|---|---|---|
| message1 | C | 0.5 MBps | |
| message2 | C | 3 MBps | B |
| message3 | C,D | 2 MBps | B |
| message4 | C | 2 MBps | |

| message type | ID CHARACTER STRINGS | AMOUNT OF MESSAGE FLOW | LINKAGE HISTORY |
|---|---|---|---|
| message1 | C | 0.5 MBps | B |
| message2 | C | 3 MBps | B |
| message3 | C | 2 MBps | D |
| message4 | C | 2 MBps | D |

| message type | ID CHARACTER STRINGS | AMOUNT OF MESSAGE FLOW | LINKAGE HISTORY |
|---|---|---|---|
| message1 | C | 0.5 MBps | B C |
| message2 | C | 3 MBps | B C |
| message3 | C | 2 MBps | D C |
| message4 | C | 2 MBps | D C |

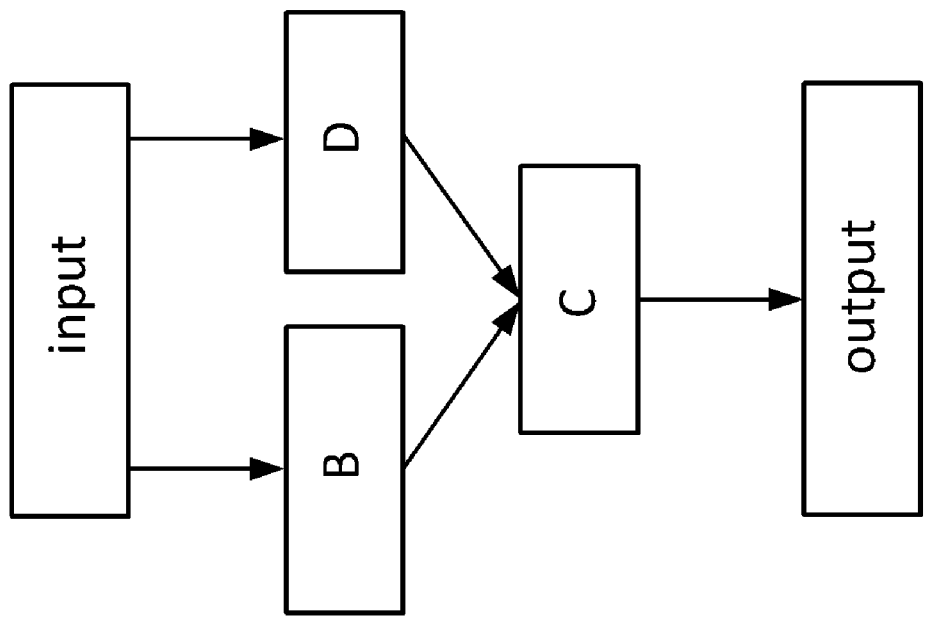

LINKAGE SUPPORT APPARATUS AND METHOD THEREOF

CROSS-REFERENCE TO RELATED APPLICATIONS

This application is related to and claims priority to Japanese patent application no. 2008-85372 filed on Mar. 28, 2008 in the Japan Patent Office, incorporated by reference herein.

FIELD

This embodiment relates to linkage processing of transactions to achieve high efficiency.

BACKGROUND

A system in which messages are exchanged over multi-layered servers such as in electronic-commerce, typically uses character strings to communicate. A request ID is used as a key to relate messages for exchanging them. This kind of system may use different ID character strings among each of layers such as a Web server, and an application server.

When monitoring a system behavior, or analyzing a delay in processing a request, it is required that related requests be put together (linked) at high speed, and a route and a timing in which a specific request are transmitted are analyzed.

FIG. 23 is a diagram for explaining a system design of a conventional linkage system.

In order to enable high-speed linkage processing, parallel processing of linkages should be increased while eliminating unnecessary linkage processing, and the amount of data transfer should be reduced as well. Therefore, when there are many kinds of ID character strings, fast processing flow may be difficult to achieve.

It would be desirable if messages transferred over a plurality of servers could be linked with one character string; however, in many cases, this may not be possible. There is a method in which all keywords that may be used for linkage are sequentially linked, but this method is inefficient.

Due to difficulty in designing linkage systems, conventional linkages systems are designed by depending on manual operation to enable parallel processing of linkages and reduce the amount of data transfer.

SUMMARY

According to an aspect of the invention, a linkage support system links related messages among a plurality of messages sent and received among a plurality of communication terminals. The linkage support system includes an information acquisition unit that acquires message types of the plurality of messages, character strings included in the plurality of messages, and amount of data flow when the character strings are transferred. An unnecessary character strings exclusion unit excludes character strings that are not required as keywords for linkage processing from a plurality of character strings acquired by the information acquisition unit, based on the information acquired by the information acquisition unit. A processing order determination unit determines order for using a plurality of character strings from which unnecessary character strings are excluded by the unnecessary character strings exclusion unit for linkage processing, based on the information acquired by the information acquisition unit.

Other features and advantages of embodiments of the invention are apparent from the detailed specification and, thus, are intended to fall within the scope of the appended claims. Further, because numerous modifications and changes will be apparent to those skilled in the art based on the description herein, it is not desired to limit the embodiments of the invention to the exact construction and operation illustrated and described, and accordingly all suitable modifications and equivalents are included.

BRIEF DESCRIPTION OF DRAWINGS

FIG. 4 is a diagram illustrating an example of input data to a linkage support apparatus of an embodiment;

FIG. 12 is a diagram illustrating an example of a correspondence table created by a processing at S103a;

FIG. 14 is a diagram illustrating a group of messages that are excluded from messages to be linked;

FIG. 15 is a diagram illustrating an example of a correspondence table recreated by a processing order determination unit 104 regarding ID character strings and message;

FIG. 16 is a diagram illustrating a change in a correspondence table with progress of linkage processing;

FIG. 17 is a diagram for explaining output of a linkage support apparatus of an embodiment;

DESCRIPTION OF EMBODIMENT

Now, preferred embodiments of this invention are explained by referring to the accompanying drawings.

Figure 1:
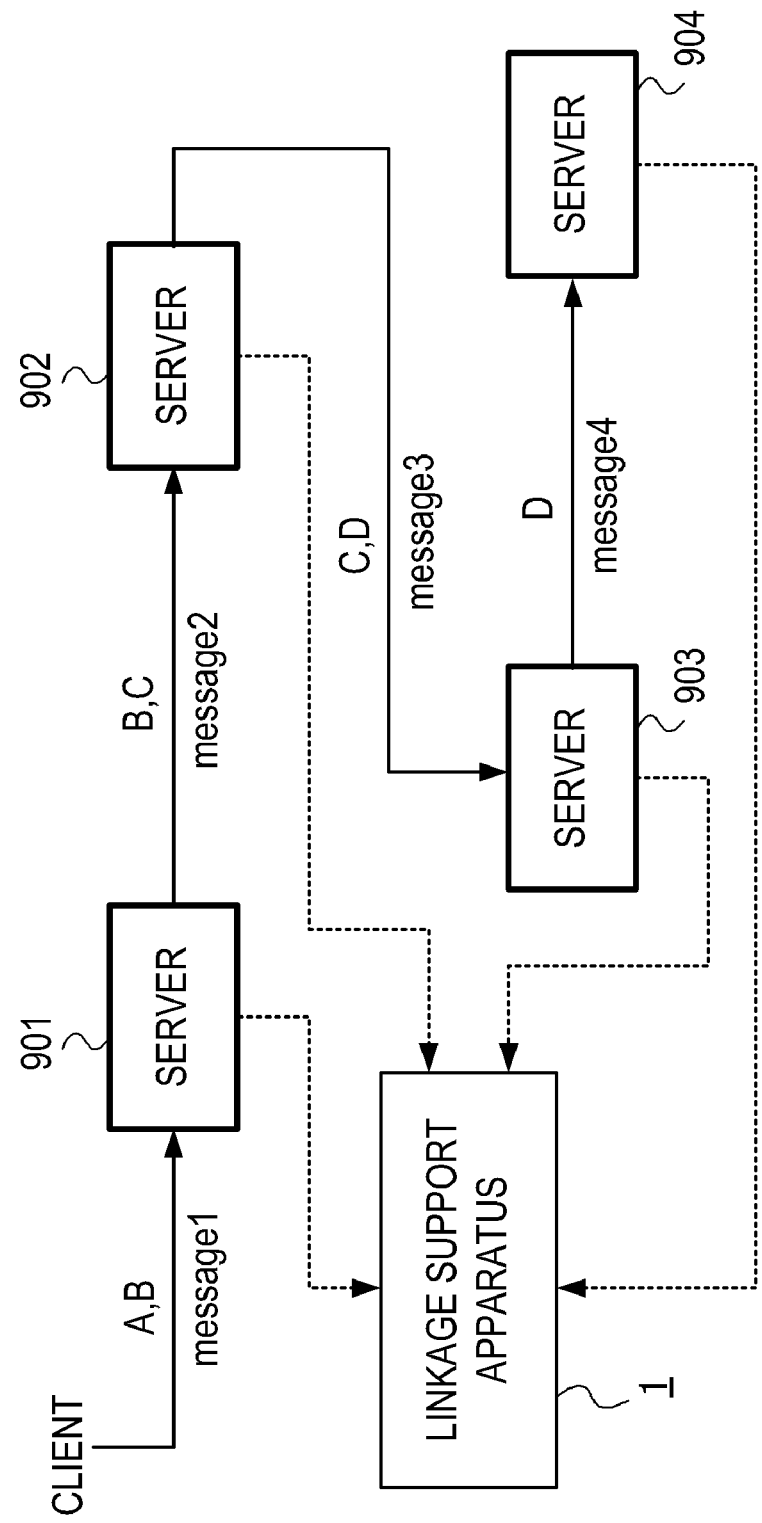
FIG. 1 is a conceptual diagram illustrating an overview of a system that includes a linkage support apparatus of an embodiment.

FIG. 1 is a conceptual diagram illustrating an overview of a system that includes a linkage support apparatus of an embodiment.

A system according to an embodiment provides servers 901 to 904, and a linkage support apparatus 1. In FIG. 1, the linkage support apparatus 1 may acquire required information from each of servers 901 to 904 (indicated by dashed arrow). The linkage support apparatus 1 may acquire the information directly from servers 901 to 904 as shown in FIG. 1, or may be acquired via a communication terminal such as a server.

Here, as an example, a server 901 is a HTTP server, a server 902 is an application server, a server 903 is a database server, and a server 904 is a server that performs processing of deeper layers.

In FIG. 1, when a client sends a "message 1" (for example, a communication message in Hyper text Transfer Protocol (HTTP) and includes character strings A and B) to a server 901, the server 901 sends a "message 2" (for example, a communication message in Internet Inter-ORB Protocol (IIOP) and includes character strings B and C)) corresponding to the "message 1" to a server 902. When the "message 2" is sent to a server 902, the server 902 sends a "message 3" corresponding to the "message 2" to a server 903. When the "message 3" (for example, a communication message in Oracle (registered trademark) message protocol and includes character strings C and D) is sent to a server 903, the server 903 sends a "message 4" (a communication message in a communication protocol supported by a server 904 that includes a character string D) to the server 904.

Figure 2:
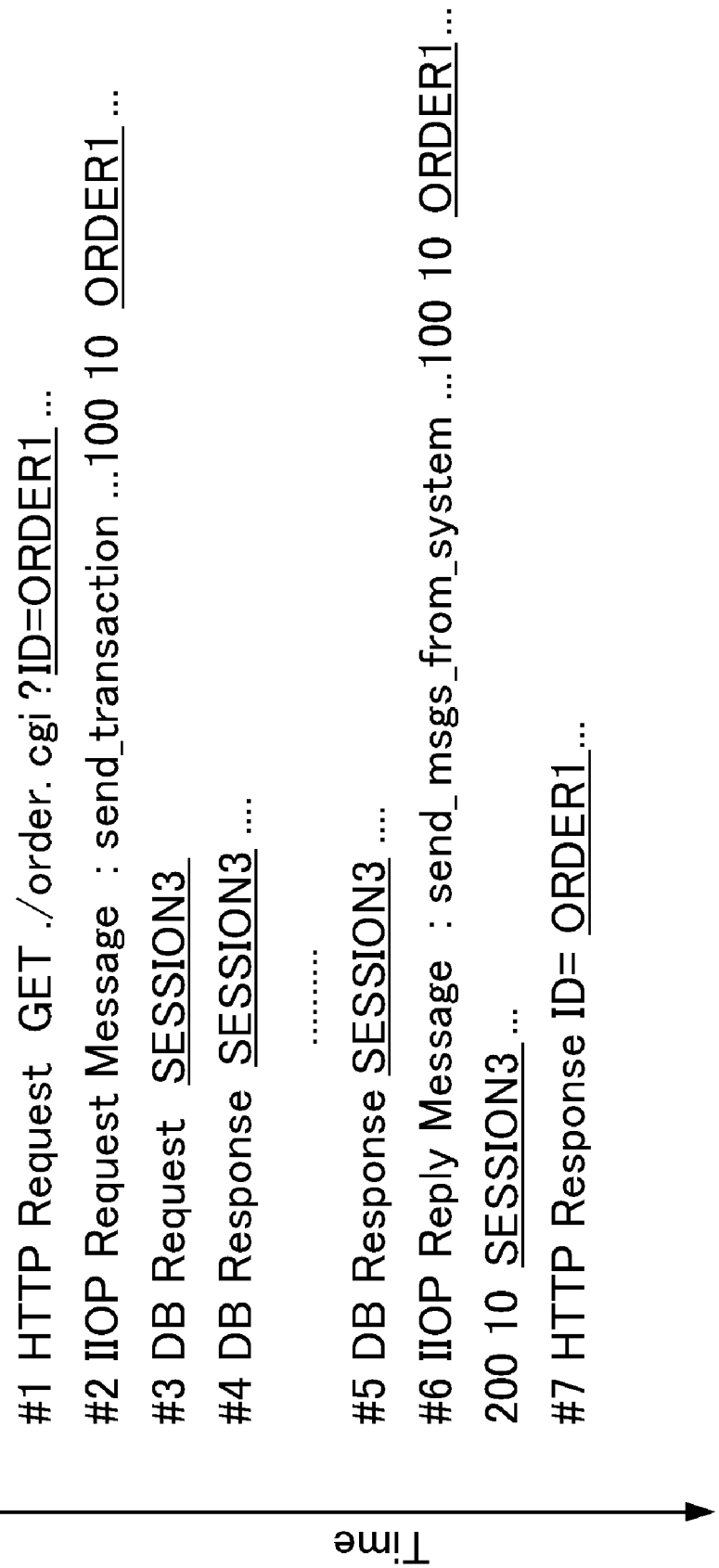
FIG. 2 is a diagram illustrating a change in contents of a series of messages sent and received among servers 901 to 904.

FIG. 2 is a diagram illustrating a change in contents of a series of messages sent and received among servers 901 to 904. In an example shown in FIG. 2, a transaction is made by setting character strings, "ID=ORDER1" and "SESSION3" as keywords.

Figure 3:
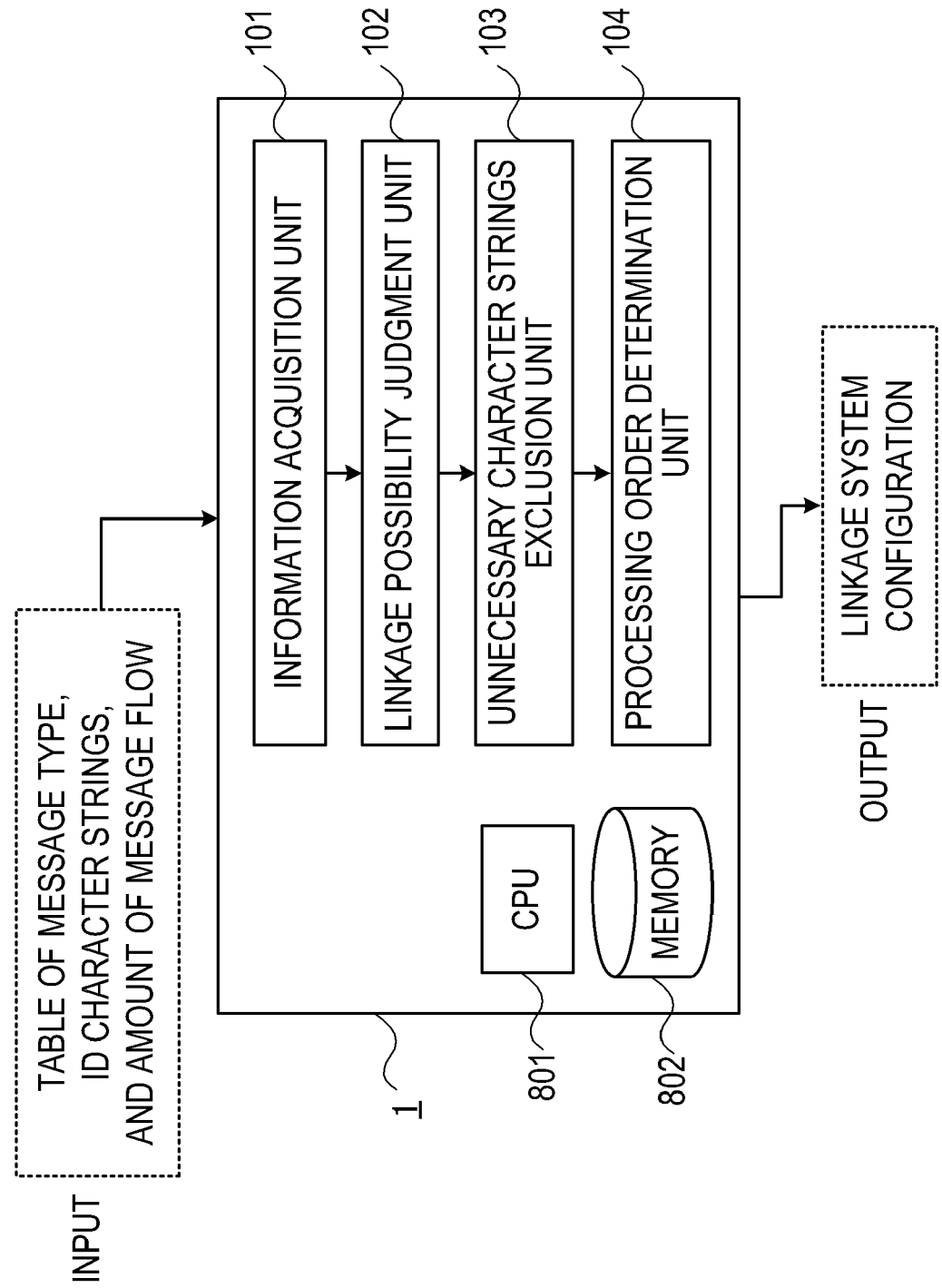
FIG. 3 is a diagram illustrating a configuration of a linkage support apparatus 1 of an embodiment.

FIG. 3 is a diagram illustrating a configuration of a linkage support apparatus of an embodiment.

A linkage support apparatus 1 of an embodiment supports processing of linking related messages among a plurality of messages sent and received among a plurality of communication terminals. More specifically, the linkage support apparatus 1 receives a message type of a message exchanged among servers as an input (message type), ID character strings included in the message, and amount of data flow of the message. Based on these, information indicating execution order of linkage processing for each ID character string and indicating ID character strings to which linkage may be applied in parallel is output as a partial order graph.

The linkage support apparatus 1 includes an information acquisition unit 101, a linkage possibility judgment unit 102, an unnecessary character strings exclusion unit 103, a processing order determination unit 104, a CPU 801, and a memory 802.

The information acquisition unit 101 may acquire the following, for example, from servers 901 to 904: a plurality of messages (for example, messages 1 to 4), a type of each message, character strings included in the plurality of messages, and amount of data flow when the messages are sent. The message type in this embodiment means, for example, a communication protocol.

The linkage possibility judgment unit 102 judges whether a plurality of messages sent and received among servers 901 to 904 may be linked based on at least one character string included in each of the plurality of messages.

The unnecessary character strings exclusion unit 103 excludes character strings that are not required as keywords for linkage processing from a plurality of character strings acquired by the information acquisition unit 101, based on the information acquired by the information acquisition unit 101.

The processing order determination unit 104 determines the order for using a plurality of character strings from which unnecessary character strings are excluded by the unnecessary character strings exclusion unit 103 for linkage processing, based on the information acquired by the information acquisition unit 101. More specifically, the processing order determination unit 104 determines processing order so that character strings with smaller total amount of data flow if linkage is applied is used first, based on the information on amount of data flow acquired by the information acquisition unit 101.

Moreover, based on a plurality of character strings from which unnecessary character strings are excluded by the unnecessary character strings exclusion unit 103, the processing order determination unit 104 determines linkages that may be processed in parallel among linkage processing for the plurality of character strings.

The CPU 801 performs various operations in the linkage support apparatus 1, and enables various functions by executing programs stored in the memory 802. The memory 802 may be configured, for example, by a read only memory (ROM) or a random access memory (RAM), and stores various information and programs used by the linkage support apparatus 1.

FIG. 4 is a diagram illustrating an example of input data to a linkage support apparatus according to an embodiment. In this example, a message type, ID character strings and amount of message flow included in the message type are input as a pair.

Figure 5:
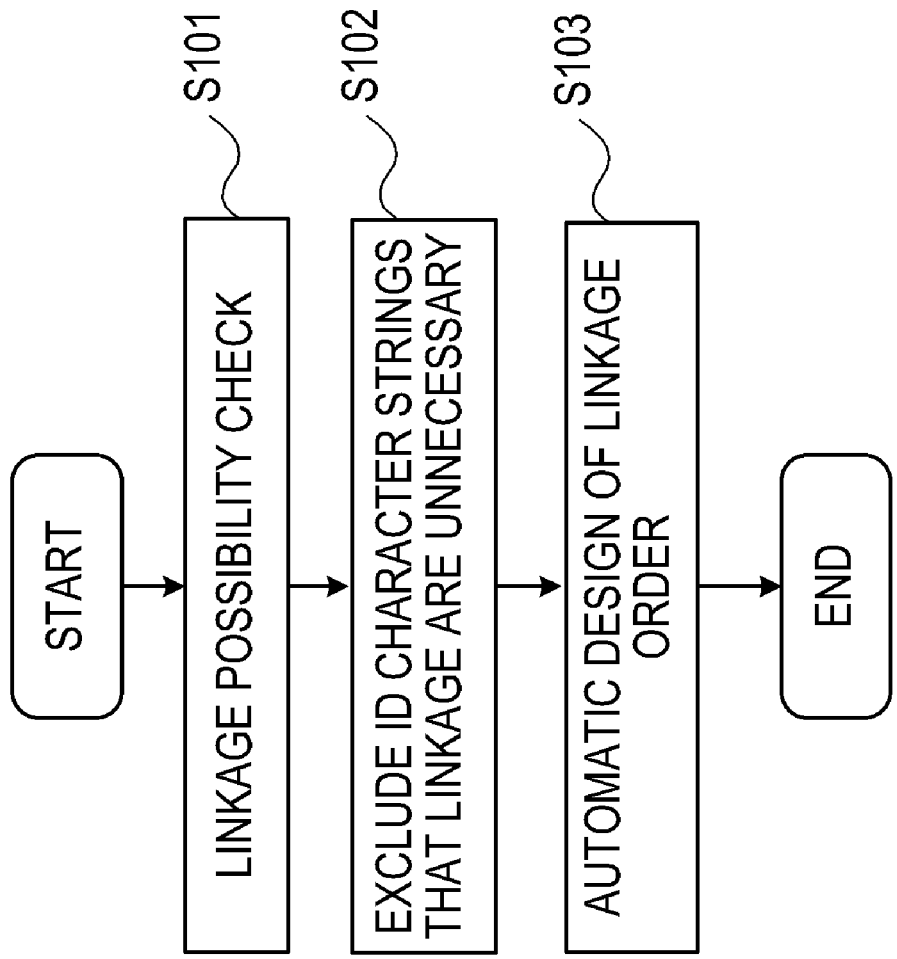
FIG. 5 is a flow chart illustrating an overall flow (method for supporting linkage) of processing in a linkage support apparatus of an embodiment.

FIG. 5 is a flow chart illustrating an overall flow (method for supporting linkage) of processing in a linkage support apparatus of an embodiment.

As shown in FIG. 5, the linkage support apparatus 1 of an embodiment performs processing procedure and network design that enables faster automatic linkage as below, based on a type of message sent and received among each of the servers, and the table of ID character strings included in the message.

The linkage possibility judgment unit 102 checks whether a plurality of messages to be linked may be automatically linked or not (S101).

The unnecessary character strings exclusion unit 103 excludes ID character strings that are not required for linkage processing from character strings that are candidates for linkage processing, and extracts a minimum set of ID character strings (S102).

The processing order determination unit 104 automatically determines a processing order of ID character strings to be linked (S103).

Figure 6:
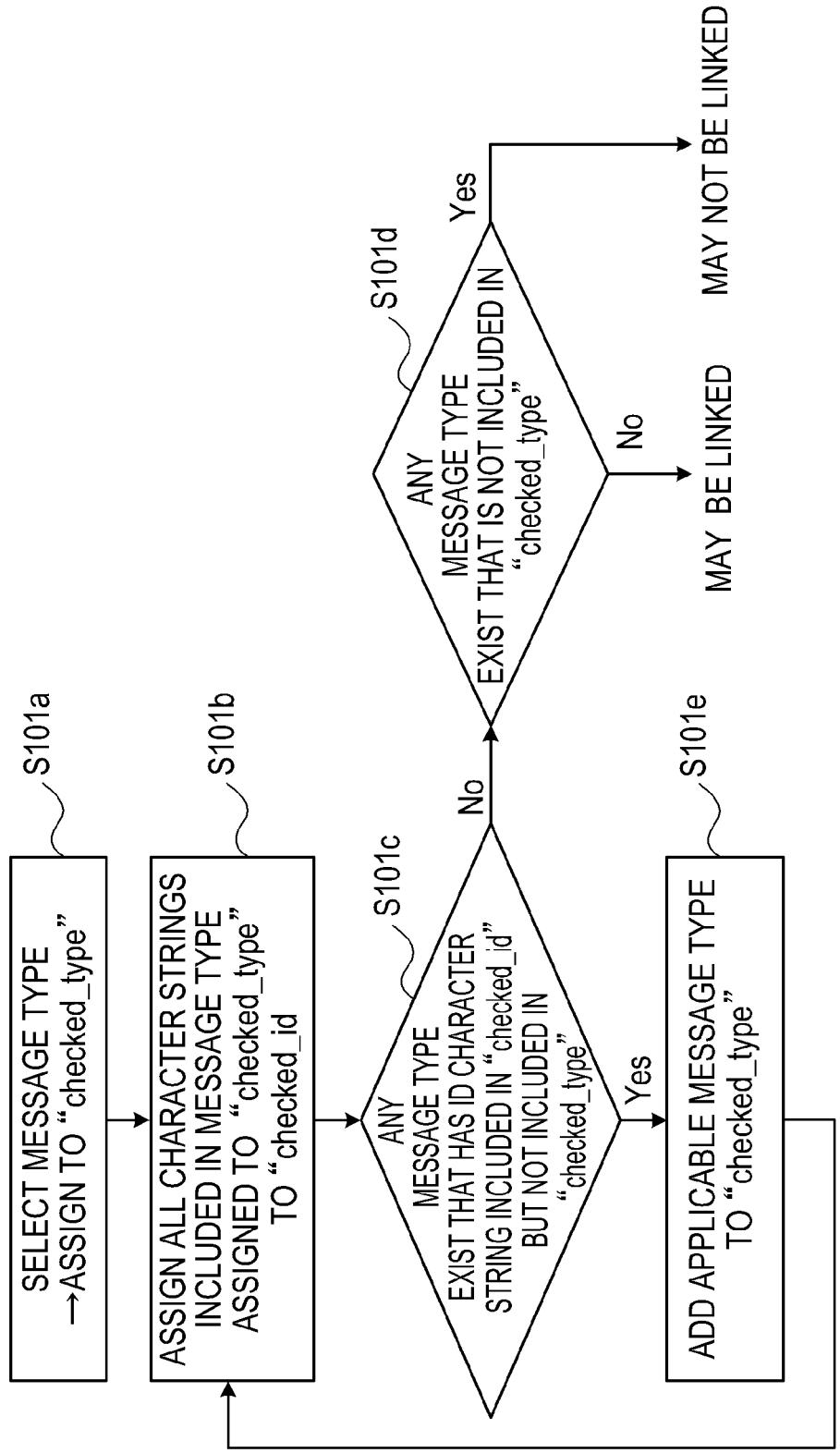
FIG. 6 is a flow chart illustrating details of processing of linkage possibility check (S101) in a linkage support apparatus of an embodiment.

FIG. 6 is a flow chart illustrating details of processing of linkage possibility checks (S101) in a linkage support apparatus of an embodiment.

By the processing shown in FIG. 6, a linkage possibility judgment unit 102 judges whether a plurality of messages sent and received among servers 901 to 904 may be linked to each other based on at least one of character strings included in the plurality of messages. A "checked_type" and "checked_id" here are temporary variables.

First, the linkage possibility judgment unit 102 selects a message type from a plurality of messages and assigns the message type to a variable, "checked_type" (S101a).

Next, the linkage possibility judgment unit 102 assigns all character strings included in messages of the message type assigned to the "checked_type" to a variable "checked_id" (S101b).

When there is a message that has any of the ID character strings assigned to the variable "checked_id", and with a message type that is not assigned to the variable, "checked_type" (S101c, Yes), then the linkage possibility judgment unit 102 adds the message type to the variable, "checked_type" (S101e).

On the other hand, when there is a message that has any of the ID character strings assigned to the variable "checked_id", and with a message type that is not assigned to the variable, "checked_type" as well (S101c, No), (S101d, No), it is judged that a linkage may be possible. When there is a message type which is not assigned to the variable, "checked_type" (S101d, Yes), it is judged that the linkage may be impossible.

Figure 7:
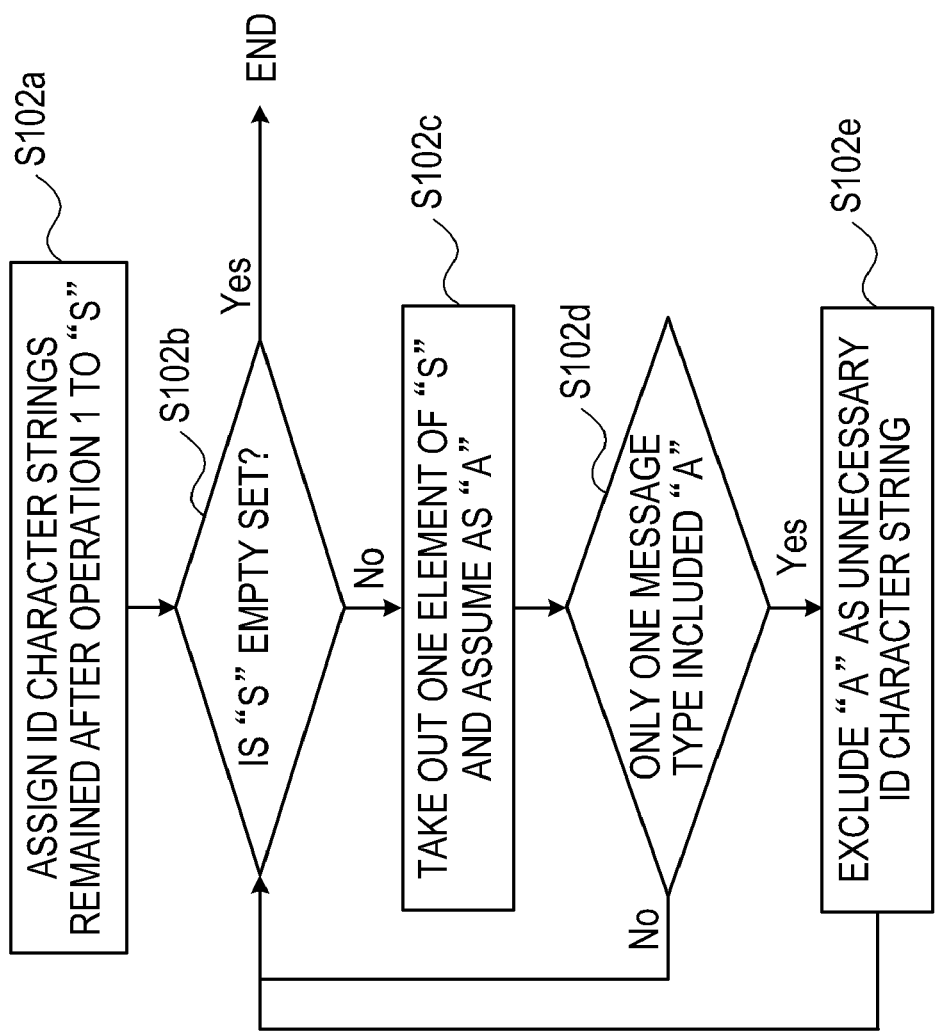
FIG. 7 is a flow chart illustrating procedures of excluding character strings in linkages that are unnecessary (Operation 1) by an unnecessary character strings exclusion unit 103 of a linkage support apparatus of an embodiment.

FIG. 7 is a flow chart illustrating procedures of excluding character strings for which linkage is unnecessary (Operation 1) by an unnecessary character strings exclusion unit 103 of a linkage support apparatus of an embodiment.

First, the unnecessary character strings exclusion unit 103 assigns a set of ID character strings that do not require linkages and are to be excluded to a variable "S" (S102a).

Subsequently, the unnecessary character strings exclusion unit 103 judges whether the variable "S" is an empty set or not, and if it is an empty set (S102b, Yes), the processing is completed.

When the variable "S" is not an empty set (S102b, No), the unnecessary character strings exclusion unit 103 takes out one ID character string assigned to the variable "S", and the ID character string is assumed to be a variable "A" (S102c).

When there are more than one messages with a message type that includes a character string of variable "A" (S102d, No), processing returns to S102b.

When there is only one message with the message type that includes a character string of variable "A" (S102d, Yes), the unnecessary character strings exclusion unit 103 excludes the variable "A" from candidate character strings for linkage processing as unnecessary character strings (S102e).

Figure 8:
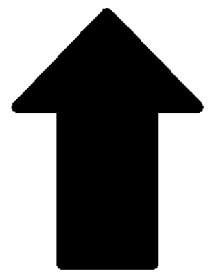
FIG. 8 is a diagram illustrating messages from which ID character strings in linkages that are unnecessary are excluded (Operation 1)

FIG. 8 is a diagram illustrating messages from which ID character strings that make unnecessary linkages have been excluded (Operation 1). FIG. 8 shows that the character string A is excluded from candidate character strings for linkage as unnecessary.

As explained above, the unnecessary character strings exclusion unit 103 excludes a character string (A in FIG. 8) included only in one message as unnecessary for keywords in linkage processing, because the character string is not required to be linked.

Figure 9:
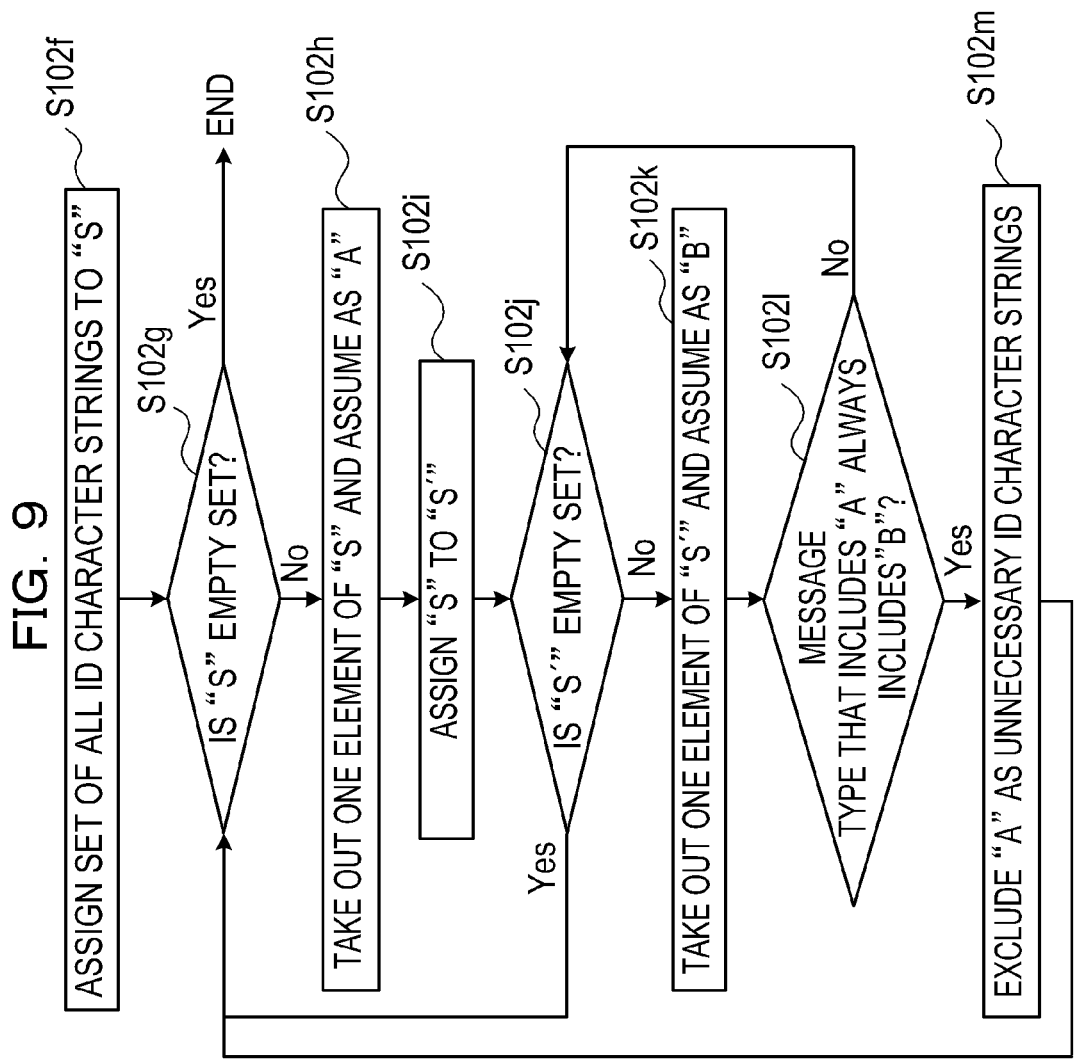
FIG. 9 is a flow chart illustrating procedures of excluding character strings that are unnecessary by an unnecessary character strings exclusion unit 103 of a linkage support apparatus of an embodiment (Operation 2)

FIG. 9 is a flow chart illustrating procedures for excluding character strings for which linkage is unnecessary (Operation 2) by the unnecessary character strings exclusion unit 103 of a linkage support apparatus of an embodiment.

First, the unnecessary character strings exclusion unit 103 assigns a set of ID character strings that do not require linkages and are to be excluded to a variable "S" (S102f).

Subsequently, the unnecessary character strings exclusion unit 103 judges whether the variable "S" is an empty set or not, and if it is an empty set (S102g, Yes), the processing completes.

When the variable "S" is not an empty set (S102g, No), the unnecessary character strings exclusion unit 103 takes out one ID character string assigned to the variable "S", and the ID character string is assumed to be a variable "A" (S102h).

Then, the unnecessary character strings exclusion unit 103 assigns the variable "S" to "S'" (S102i). When "S'" is an empty set (S102j, Yes), the processing returns to S102g.

When "S'" is not an empty set (S102j, No), the unnecessary character strings exclusion unit 103 takes out one ID character string assigned to the variable "S'", and the ID character string is assumed to be a variable "B" (S102k).

When messages that include the variable "A" always do not include the variable "B" (S102l, No), the processing returns to S102j.

When messages that include the variable "A" always include the variable "B" (S102l, Yes), the unnecessary character strings exclusion unit 103 excludes character strings assigned to the variable "A" from candidate character strings for linkage processing as unnecessary character strings for linkage processing (S102m).

Figure 10:
FIG. 10 is a diagram illustrating messages from which ID character strings in linkages that are unnecessary are excluded (Operation 2)

FIG. 10 is a diagram illustrating messages which are excluded because they have ID character strings for which linkage is unnecessary (Operation 2). FIG. 10 shows how the character string "G" included in a message with "message_type (a)" and "G" and "I" included in a message with "message_type (c)" are excluded from candidate character strings for linkage as unnecessary character strings.

As described above, when a message that includes the first character string has a second character string that is different from the first character string, the unnecessary character strings exclusion unit 103 excludes the first character string as unnecessary for keywords in linkage processing because there is no need to link using the first character string. In an example of FIG. 10, a message type that includes "G" always has "H", thus "G" is excluded. Moreover, a message type that includes "I" always has "H", thus "I" is excluded.

Figure 11:
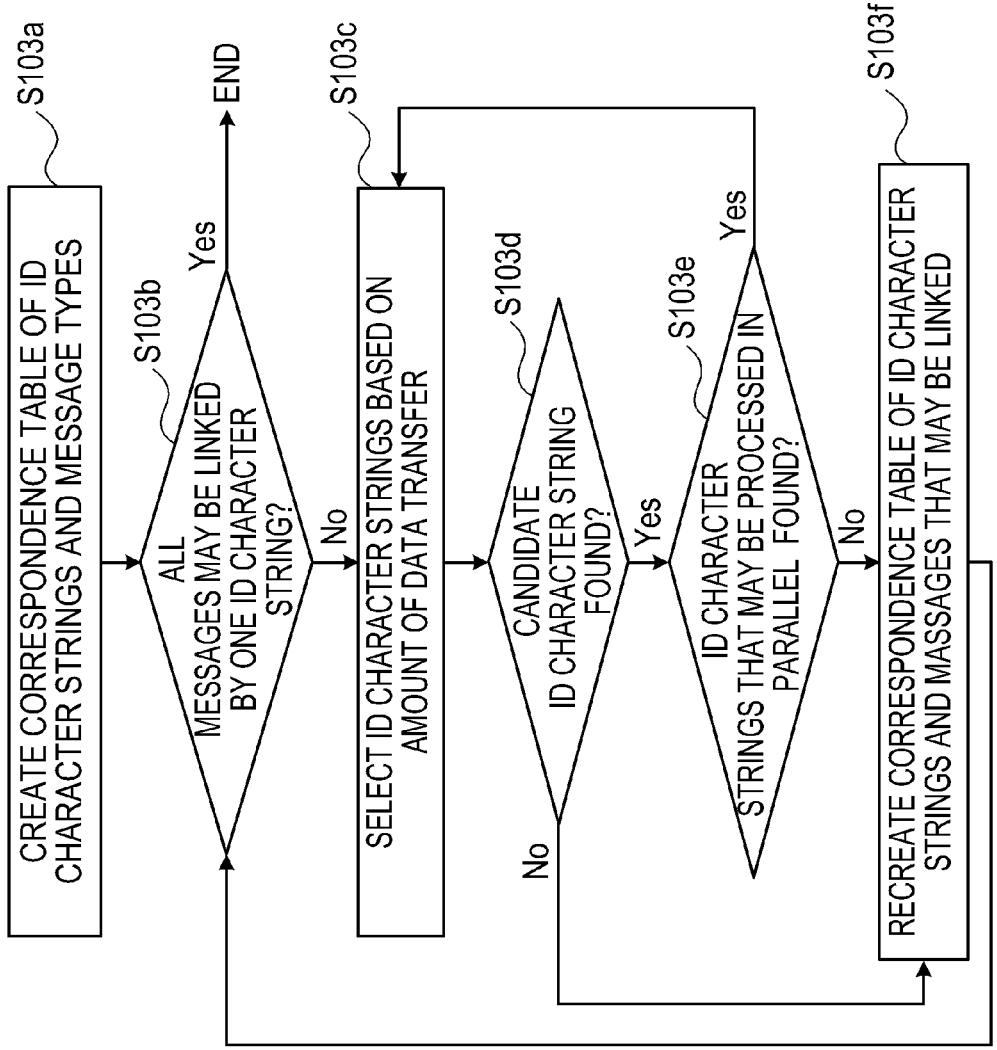
FIG. 11 is a flow chart illustrating an overview of processing for automatic design of linkage order by a processing order determination unit 104.

FIG. 11 is a flow chart illustrating an overview of processing of automatic design of linkage order by a processing order determination unit 104.

The processing order determination unit 104 creates a correspondence table of ID character strings and message types that may be linked (S103a). FIG. 12 is a diagram illustrating an example of a correspondence table created by a processing at S103.

As shown in FIG. 12, "message 1" and "message 2" may be linked by a character string "B", "message 2" and "message 3" may be linked by a character string "C", and "message 3" and "message 4" may be linked by a character string "D".

A processing order determination unit 104 judges whether all messages may be linked by one ID character string or not, and if all messages may be linked by one ID character string (S103b, Yes), the processing completes.

If all messages may not be linked by one ID character string (S103b, No), by one ID character string, the processing order determination unit 104 selects candidate character strings for linkage processing based on amount of data transfer (S103c).

Figure 13:
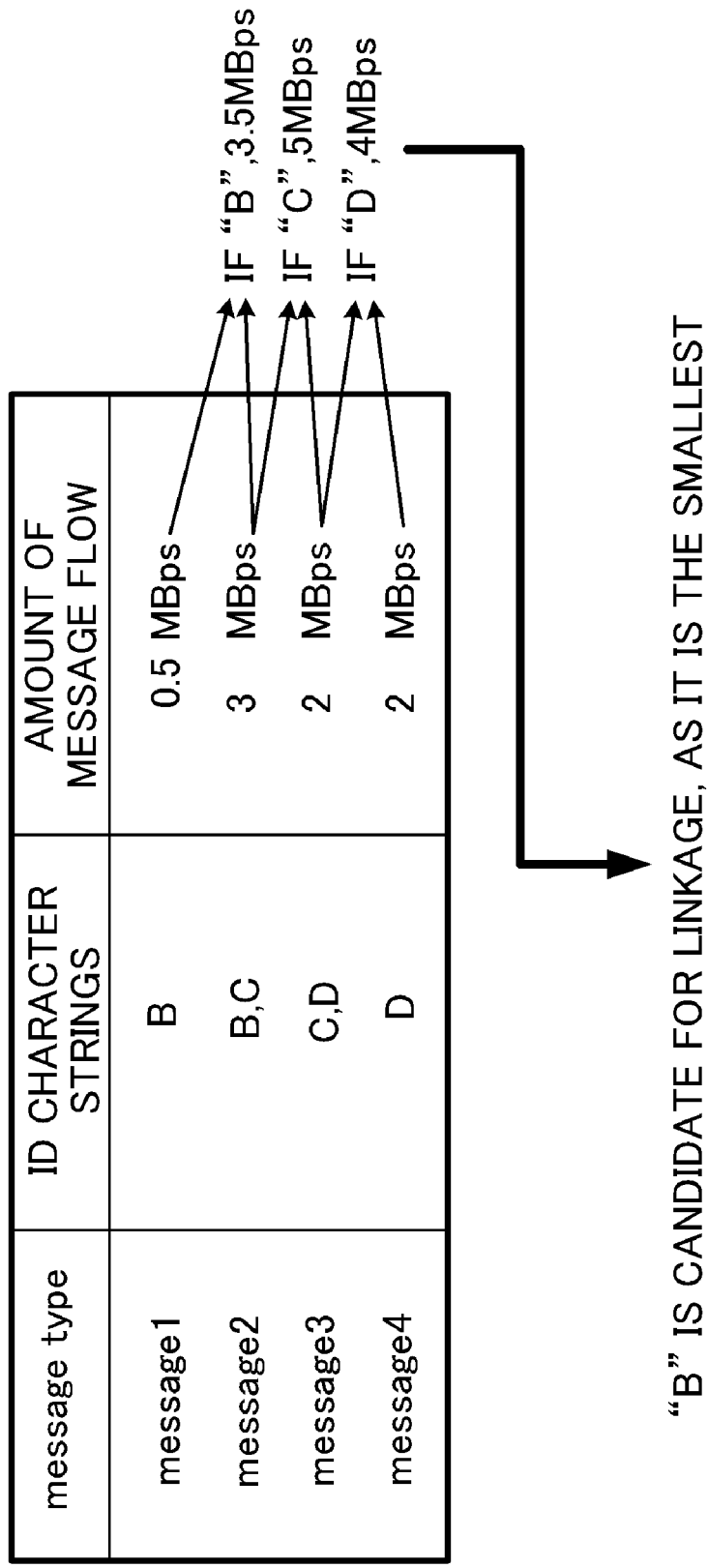
FIG. 13 is a diagram for explaining selection of ID character strings to be linked based on amount of data transfer.

FIG. 13 is a diagram for explaining selection of ID character strings to be linked based on amount of data transfer. In order to reduce amount of data transfer, the processing order determination unit 104 selects character strings such that the total amount of data flow of message types to be linked is the smallest. Note that ID character strings included only in a single message type are excluded from the candidate. The selected ID character strings are registered to the linkage history.

When a candidate ID character string to be used for the linkage is found (S103d, Yes), the processing order determination unit 104 judges whether there is any ID character string to which the linkage may be processed in parallel or not (S103e).

When no ID character string to be used for linkage processing found (S103d, No), or when no ID character string to which linkage may be processed in parallel exists (S103e, No), the processing order determination unit 104 recreates a correspondence table of ID character strings and messages that may be linked (S103f).

FIG. 14 is a diagram illustrating a group of messages that are excluded from messages to be linked.

FIG. 15 is a diagram illustrating an example of a correspondence table recreated by the processing order determination unit 104.

FIG. 16 is a diagram illustrating a change in a correspondence table with progress of linkage processing. As shown in FIG. 16, the ID character strings selected as those used for linkage processing are deleted from the table, and the selected ID character strings are registered to a linkage history.

FIG. 17 is a diagram for explaining output of a linkage support apparatus of an embodiment.

As shown in the FIG. 17, the linkage support apparatus 1 of an embodiment outputs information, for example, as below. Note that "Input" and "Output" here are special symbols that indicate an inlet and an outlet of data.

Figure 18:
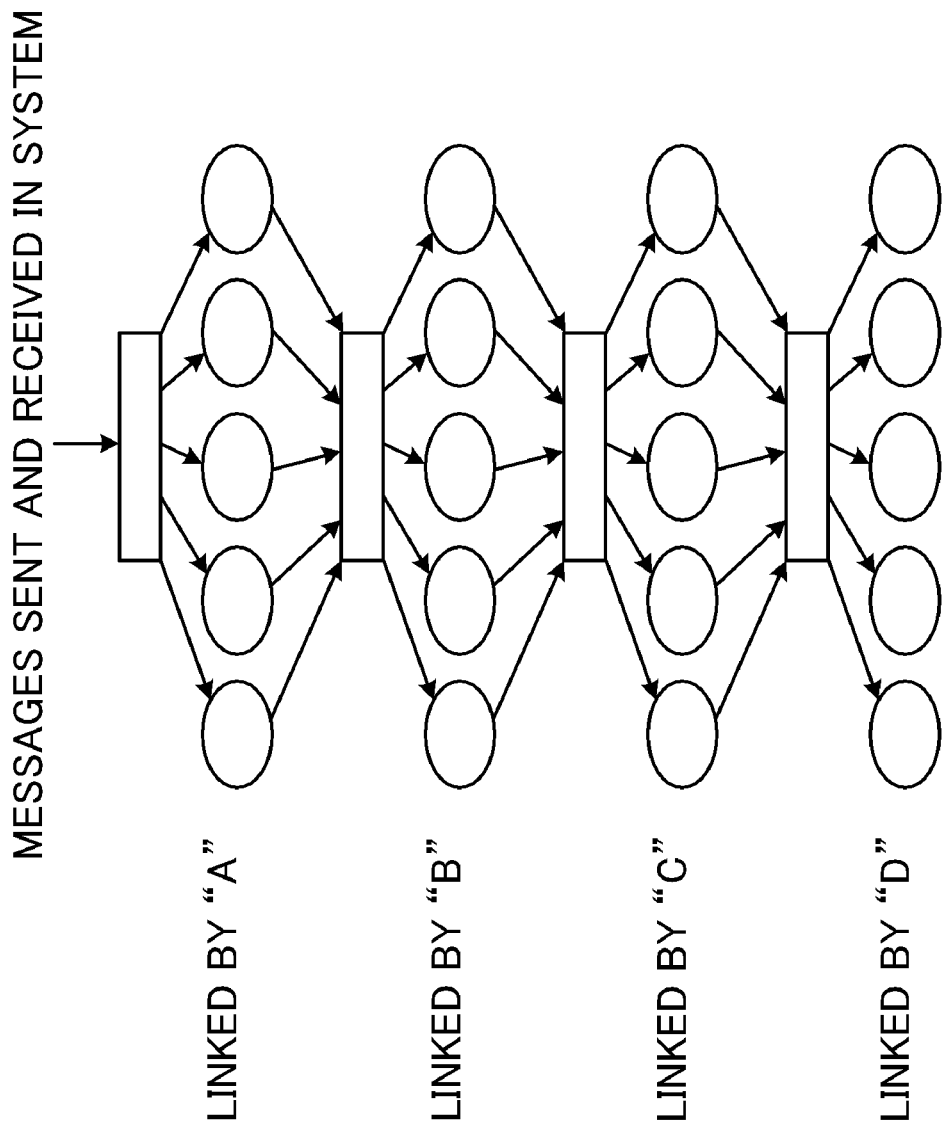
FIG. 18 is a diagram for explaining a basic configuration of a linkage system in general.

<A Pair of ID Character Strings and a Transfer Destination>
input, B
input, D
B, C
D, C
C, output FIG. 18 is a diagram for explaining a basic configuration of a linkage system in general. When a system to link a group of messages shown in this embodiment is automatically designed by conventional methods, usually the processing shown in the figure is applied. This kind of linkage processing is very inefficient in terms of amount of data flow and processing.

Figure 19:
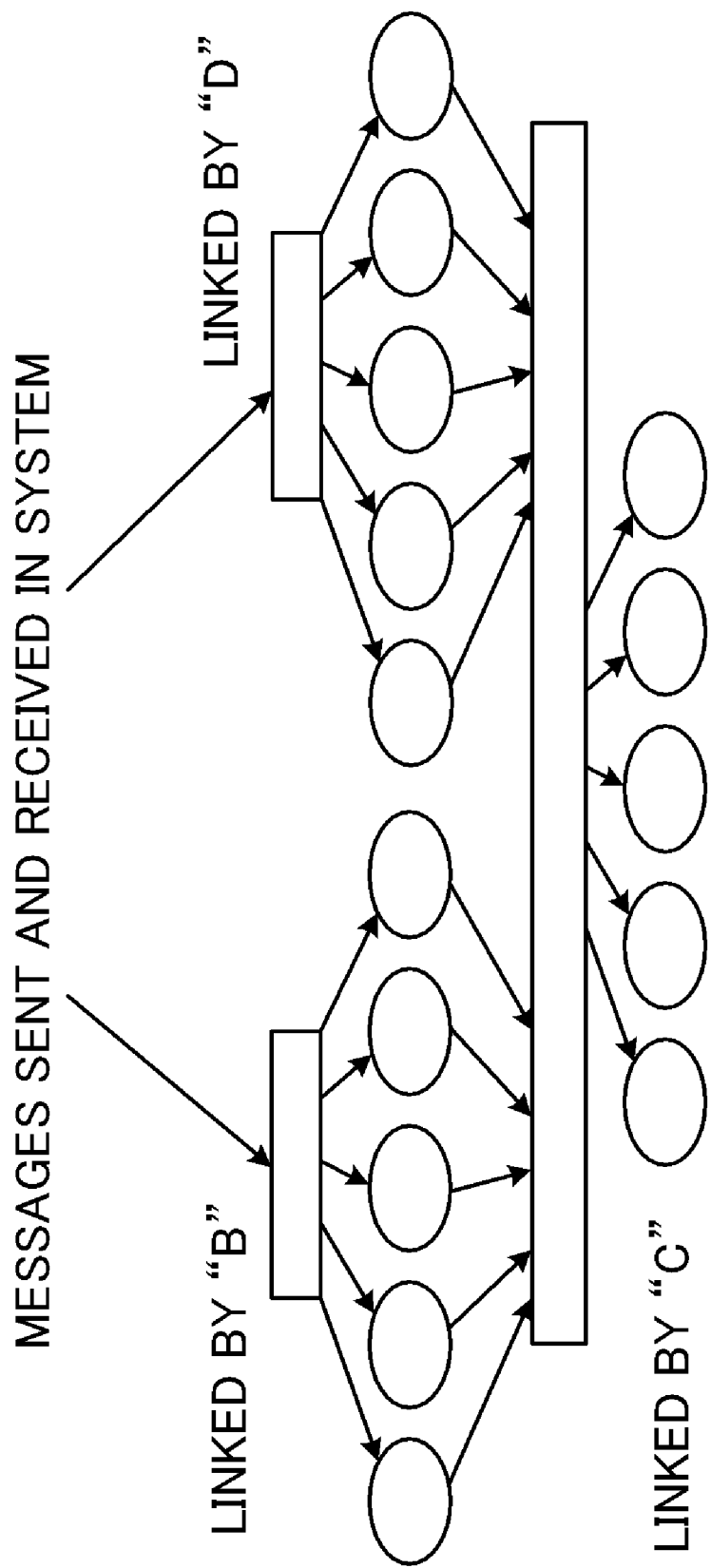
FIG. 19 is a diagram illustrating a configuration of a linkage system optimized by a linkage support apparatus of an embodiment.

FIG. 19 is a diagram illustrating a configuration of a linkage system optimized by a linkage support apparatus of an embodiment. As shown in FIG. 19, linkage processing by a linkage algorithm designed by the linkage support apparatus 1 of this embodiment enables highly efficient linkage processing while reducing amount of data flow as much as possible.

Now, a case is exemplified in which a group of messages that are different from the above example are linked by the linkage support apparatus 1 of this embodiment.

Figure 20:
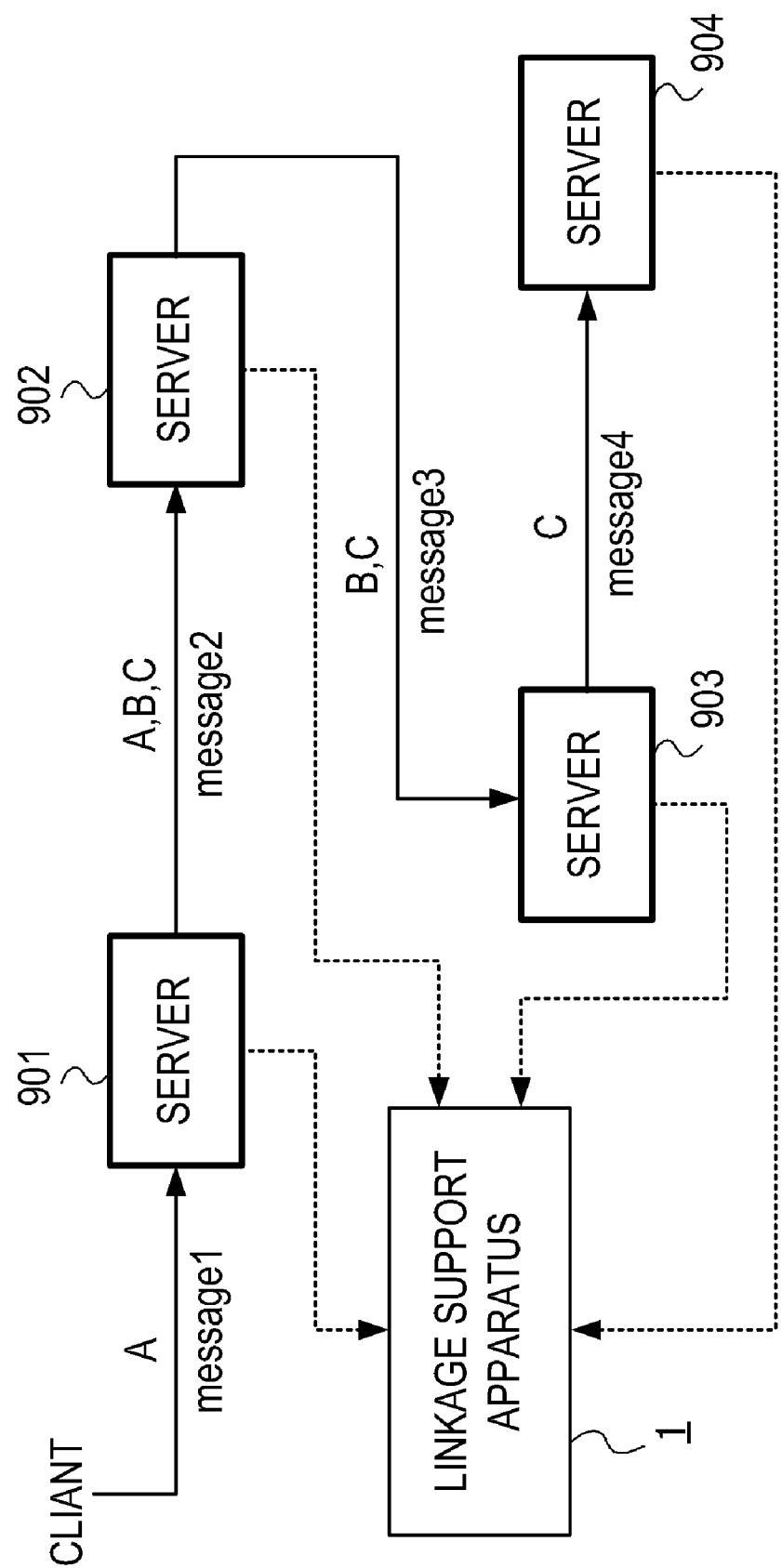
FIG. 20 is a diagram illustrating character strings included in a group of messages exchanged over servers that are different from the character strings in a system configuration shown in FIG. 1.

FIG. 20 is a diagram illustrating character strings included in a group of messages exchanged over servers that are different from the character strings in a system configuration shown in FIG. 1.

Figure 21:
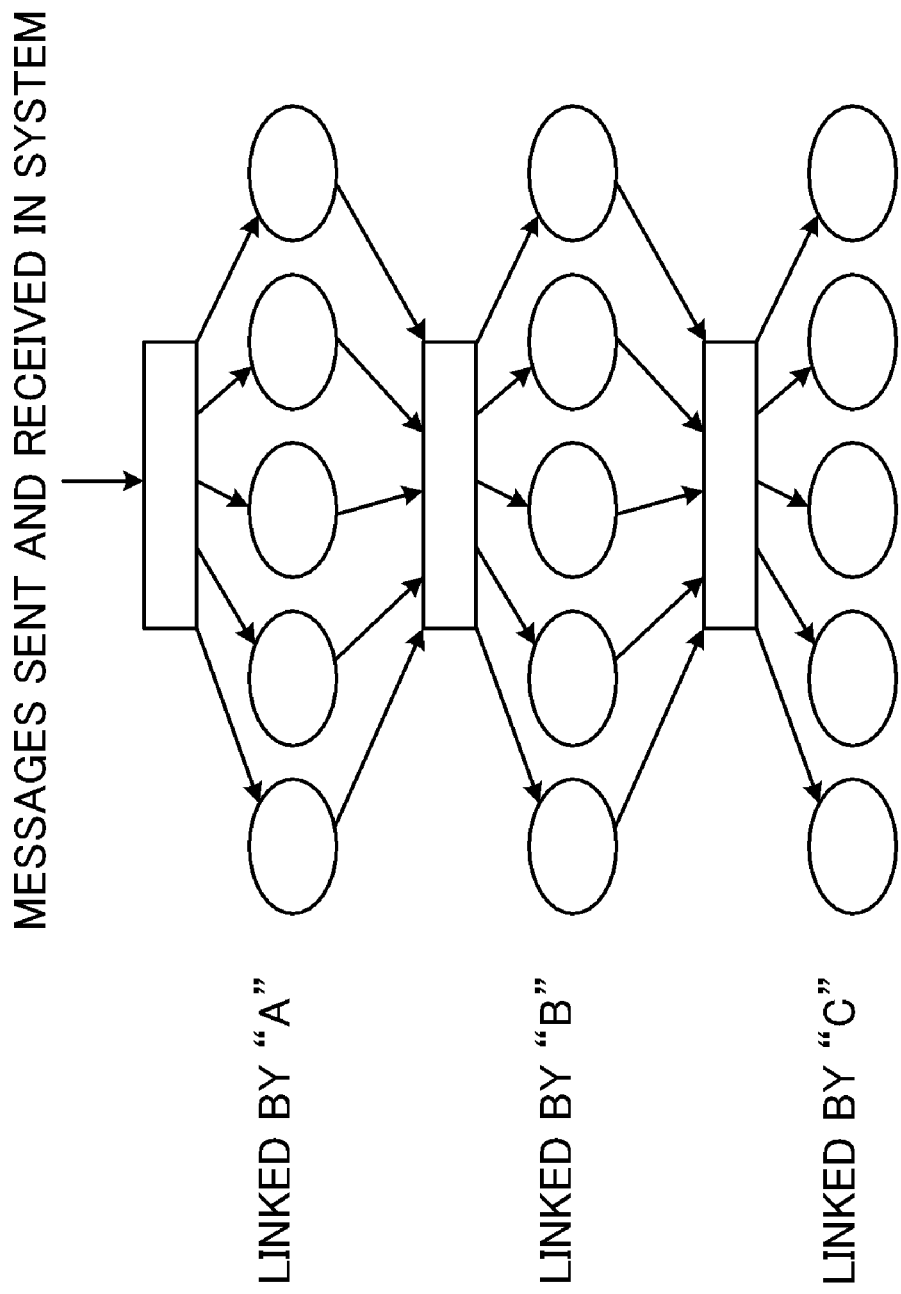
FIG. 21 is a diagram for explaining a basic configuration of a linkage system in general regarding exchange status of messages shown in FIG. 20.

FIG. 21 is a diagram for explaining a basic configuration of a linkage system in general regarding exchange of messages shown in FIG. 20. As in the example shown in FIG. 18, this kind of linkage processing is very inefficient in terms of amount of data flow and processing.

Figure 22:
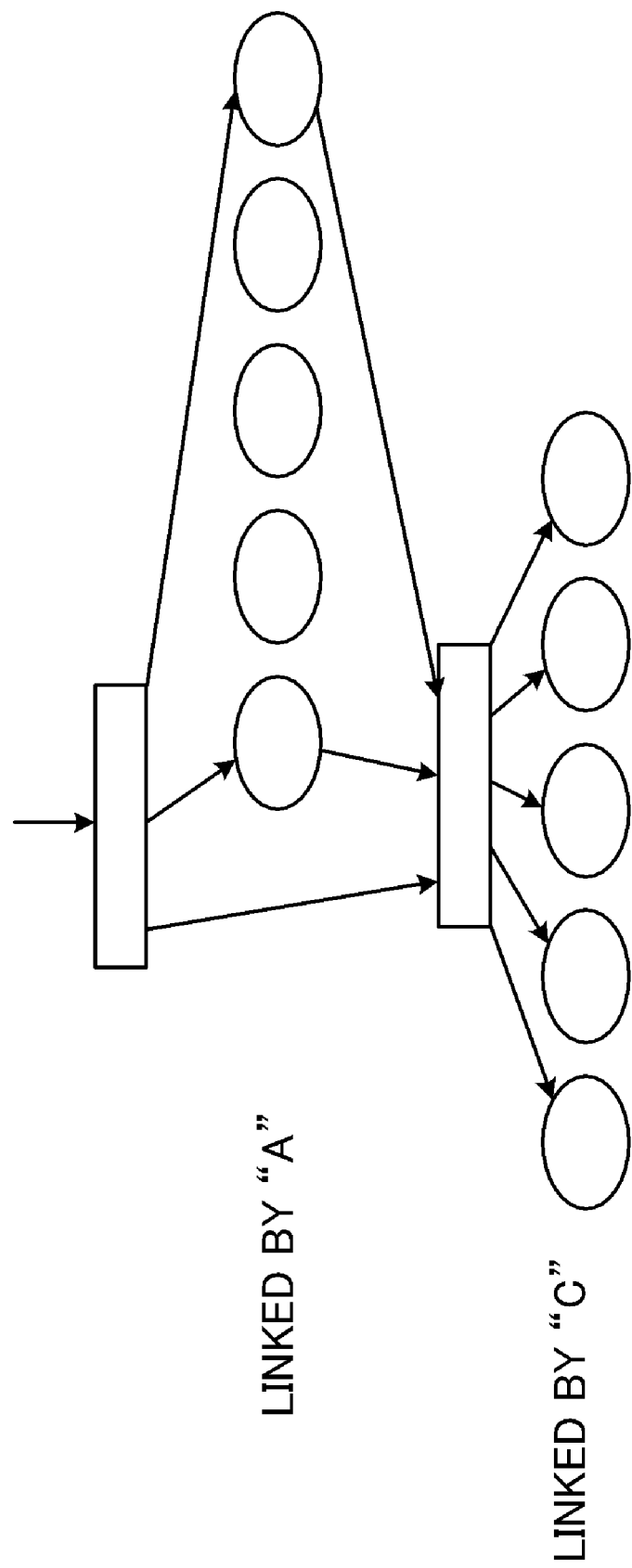
FIG. 22 is a diagram illustrating a configuration of a linkage system optimized by a linkage support apparatus 1 of an embodiment.
Figure 23:
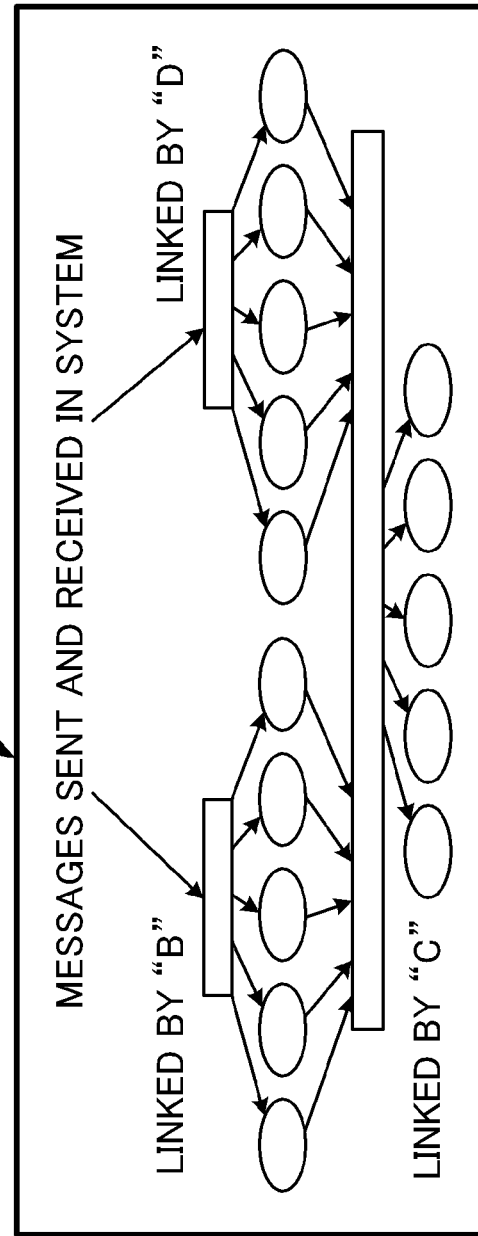
FIG. 23 is a diagram for explaining a system design of a conventional linkage system.

FIG. 22 is a diagram illustrating a configuration of a linkage system optimized by a linkage support apparatus 1 of an embodiment. In the example shown in FIG. 20, there is no need to link messages by using "B", and no need to link messages that include C but that do not include A by using "A.". Designing a link system by taking account of these conditions by the linkage support apparatus 1 of an embodiment enables highly efficient linkage processing while reducing amount of data flow as much as possible.

As described above, according to the linkage support apparatus of an embodiment, a highly efficient link system may be built automatically. Thus, substantial cost reduction in designing a complicated link system may be achieved.

According to the linkage support apparatus of this embodiment, a link system may be automatically designed by a computer. Thus a new link system may be automatically rebuilt even if amount of data transfer among servers has been substantially changed after operating for certain period.

Moreover, a program causing a computer comprising the linkage support apparatus to execute each of the above operations may be provided as a linkage support program. By recording the above described program to a computer-readable medium, the program may be executed by a computer comprising a linkage support apparatus. The computer readable medium includes internal memories such as a read only memory (ROM) and a random access memory (RAM), portable memories such as a compact disk ROM (CD-ROM), a flexible disk, digital versatile disk (DVD), a magnet-optical disk, and an integrated circuit (IC) card, and a database that stores a computer program, or other computer and the database, or further includes a transmission medium over a network.

The operations in the above linkage support method may be achieved by making a computer such as a CPU 801 execute the linkage support program.

In the above embodiment, each of the elements (an information acquisition unit 101, a linkage possibility judgment unit 102, an unnecessary character strings exclusion unit 103, a processing order determination unit 104) comprising the linkage support apparatus 1 is in equipment independent of servers 901 to 904, but the configuration is not limited to this. For example, a part of elements comprising the linkage support apparatus 1 may be distributed to one of servers 901 to 904, and as a result, the functions of linkage support apparatus 1 may be achieved as a whole system.

Although specific embodiments of the present invention have been shown and described in detail, it would be appreciated by those skilled in the art that changes may be made in these embodiments without departing from the principles and spirit of the invention, the scope of which is defined in the claims and their equivalents.

What is claimed is:

1. A linkage support system that links related messages among a plurality of messages sent and received among a plurality of communication terminals, said linkage support system comprising;
    an information acquisition unit that acquires message types of said plurality of messages, character strings included in said plurality of messages, and amount of data flow when said character strings are transferred;
    an unnecessary character strings exclusion unit that excludes character strings that are not required as keywords for linkage processing; and
    a processing order determination unit that determines a processing order of the character strings to be linked for using a plurality of character strings from which unnecessary character strings have been excluded by said unnecessary character strings exclusion unit; and
    a central processing unit that operates the information acquisition unit, unnecessary character strings exclusion unit, and processing order determination unit, wherein the processing order determination unit determines the linkage processing order of the character strings to be linked so that character strings with smaller total amount of data flow is used first, based on the amount of data flow acquired by the information acquisition unit.

2. A linkage support system according to claim 1 further comprising a linkage possibility judgment unit that judges whether a plurality of messages sent and received among communication terminals may be linked based on at least one character string included in each of the plurality of messages.

3. A linkage support system according to claim 1, wherein said unnecessary character strings exclusion unit excludes a character string included only in one message as unnecessary for keywords in linkage processing.

4. A linkage support system according to claim 1, wherein when a message that includes a first character string always has a second character string that is different from the first character string, said unnecessary character strings exclusion unit excludes the first character string as unnecessary for keywords in linkage processing.

5. A linkage support system according to claim 1, wherein based on a plurality of character strings from which unnecessary character strings have been excluded, said processing order determination unit determines linkages that may be processed in parallel.

6. A linkage support system according to claim 1, wherein said message type is a communication protocol.

7. A linkage support method that supports linking related messages among a plurality of messages sent and received among a plurality of communication terminals, wherein said computer;
 acquires message types of said plurality of messages, character strings included in said plurality of messages, and amount of data flow when said character strings are transferred;
 excludes character strings that are not required as keywords for linkage processing from a plurality of said character strings; and
 determines processing order of the character strings to be linked for using a plurality of character strings from which unnecessary character strings have been excluded, wherein
 the linkage processing order of the character strings to be linked is determined so that character strings with smaller total amount of data flow is used first, based on the amount of data flow.

8. A linkage support method according to claim 7, wherein it is judged whether a plurality of messages sent and received among communication terminals may be linked based on at least one character string included in each of the plurality of messages.

9. A linkage support method according to claim 7, wherein a character string included only in one message is excluded as unnecessary for keywords in linkage processing.

10. A linkage support method according to claim 7, wherein when a message that includes a first character string always has a second character string that is different from the first character string, the first character string is excluded as unnecessary for keywords in linkage processing.

11. A linkage support method according to claim 7, wherein based on a plurality of character strings from which unnecessary character strings have been excluded by said unnecessary character strings exclusion unit, linkages that may be processed in parallel among linkage processing for the plurality of character strings are determined.

12. A linkage support method according to claim 7, wherein said message type is a communication protocol.

13. A non-transitory computer-readable storage medium that stores a linkage support system program causing a computer to execute a linkage support method for supporting link processing that links related messages among a plurality of messages sent and received among a plurality of communication terminals, said computer-readable medium causing the computer to function as:
 an information acquisition unit that acquires message types of said plurality of messages, character strings included in said plurality of messages, and amount of data flow when said character strings are transferred;
 an unnecessary character strings exclusion unit that excludes character strings that are not required as keywords for linkage processing from a plurality of character strings acquired by said information acquisition unit; and
 a processing order determination unit that determines processing order of the character strings to be linked for using a plurality of character strings from which unnecessary character strings are excluded, wherein
 the processing order determination unit determines the linkage processing order of the character strings to be linked so that character strings with smaller total amount of data flow is used first, based on the amount of data flow acquired by the information acquisition unit.

14. A non-transitory computer-readable storage medium that stores a linkage support system program according to claim 13, the program causing the computer to function as a linkage possibility judgment unit that judges whether a plurality of messages sent and received among communication terminals may be linked, based on at least one character string included in each of the plurality of messages.

15. A non-transitory computer-readable storage medium that stores a linkage support system program according to claim 13, wherein said unnecessary character strings exclusion unit excludes a character string included only in one message as unnecessary for keywords in linkage processing.

16. A non-transitory computer-readable storage medium that stores the linkage support system program according to claim 13, wherein when a message that includes a first character string always has a second character string that is different from the first character string, said unnecessary character strings exclusion unit excludes the first character string as unnecessary for keywords in linkage processing.

17. A non-transitory computer-readable storage medium that stores a linkage support system program according to claim 13, wherein based on a plurality of character strings from which unnecessary character strings have been excluded by said unnecessary character strings exclusion unit, said processing order determination unit determines linkages that may be processed in parallel among linkage processing for the plurality of character strings.

* * * * *